United States Patent
Gong et al.

(10) Patent No.: US 12,522,770 B2
(45) Date of Patent: Jan. 13, 2026

(54) PROCESS AND SYSTEM FOR CATALYTIC CRACKING OF HYDROCARBON OILS

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Jianhong Gong, Beijing (CN); Zhigang Zhang, Beijing (CN); Xiaoli Wei, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 15 days.

(21) Appl. No.: 18/545,735

(22) Filed: Dec. 19, 2023

(65) Prior Publication Data

US 2024/0117255 A1    Apr. 11, 2024

Related U.S. Application Data

(62) Division of application No. 17/261,496, filed as application No. PCT/CN2019/095950 on Jul. 15, 2019, now Pat. No. 11,891,578.

(30) Foreign Application Priority Data

Jul. 16, 2018   (CN) .......................... 201810779819.0

(51) Int. Cl.
*B01J 8/00*    (2006.01)
*B01J 8/22*    (2006.01)
(Continued)

(52) U.S. Cl.
CPC ............. *C10G 11/187* (2013.01); *B01J 8/228* (2013.01); *C10G 11/182* (2013.01);
(Continued)

(58) Field of Classification Search
CPC ..... C10G 11/18; C10G 11/182; C10G 11/187; C10G 51/02; C10G 51/026;
(Continued)

(56) References Cited

U.S. PATENT DOCUMENTS 4,090,948 A * 5/1978 Schwarzenbek ........... B01J 8/26
                                                    208/254 R
4,895,637 A   1/1990 Owen
(Continued)

FOREIGN PATENT DOCUMENTS

CN    1234426 A    11/1999
CN    1237477 A    12/1999
(Continued)

*Primary Examiner* — Prem C Singh
*Assistant Examiner* — Brandi M Doyle
(74) *Attorney, Agent, or Firm* — NKL Law; Allen Xue

(57) ABSTRACT

A system for catalytic cracking of hydrocarbon oils has a catalytic cracking reactor, a catalyst separation device, an optional reaction product separator, and a regenerator. A catalytic cracking reactor has a dilute-phase transport fluidized bed and a fast fluidized bed connected in series for reaction. In the fast fluidized bed, the axial solid fraction ε of the catalyst is controlled within the range of about 0.1 to about 0.2. When used for catalytic cracking of hydrocarbon oil feedstocks, particularly heavy feedstock oils, the process and system show lower yields of dry gas and coke, and good product distribution.

11 Claims, 2 Drawing Sheets

(51) Int. Cl.
*C10G 11/18* (2006.01)
*C10G 51/02* (2006.01)

(52) U.S. Cl.
CPC ... *C10G 51/026* (2013.01); *B01J 2208/00796* (2013.01); *C10G 2300/107* (2013.01); *C10G 2300/1077* (2013.01); *C10G 2300/205* (2013.01); *C10G 2300/308* (2013.01); *C10G 2300/4006* (2013.01); *C10G 2300/4012* (2013.01); *C10G 2300/4018* (2013.01); *C10G 2300/4081* (2013.01); *C10G 2300/701* (2013.01); *C10G 2300/802* (2013.01); *C10G 2400/02* (2013.01); *C10G 2400/04* (2013.01); *C10G 2400/20* (2013.01); *C10G 2400/28* (2013.01)

(58) Field of Classification Search
CPC ............ C10G 2400/02; C10G 2400/04; C10G 2400/20; C10G 2400/28; C10G 2300/107; C10G 2300/1077; C10G 2300/205; C10G 2300/308; C10G 2300/4006; C10G 2300/4012; C10G 2300/4018; C10G 2300/4081; C10G 2300/701; C10G 2300/802; B01J 8/228; B01J 2208/00796
See application file for complete search history.

(56) References Cited

U.S. PATENT DOCUMENTS

| | | |
|---|---|---|
| 5,034,115 A | 7/1991 | Avidan |
| 5,059,302 A * | 10/1991 | Weinberg ............... C10G 11/18 208/113 |
| 5,284,575 A | 2/1994 | Owen |
| 6,538,169 B1 | 3/2003 | Pittman et al. |
| 2002/0003103 A1 | 1/2002 | Henry et al. |
| 2002/0189973 A1 | 12/2002 | Henry et al. |
| 2002/0195373 A1 | 12/2002 | Ino et al. |
| 2003/0121825 A1 | 7/2003 | Pittman et al. |
| 2003/0127358 A1 | 7/2003 | Letzsch |
| 2011/0000818 A1 | 1/2011 | Xu et al. |

FOREIGN PATENT DOCUMENTS

| | | |
|---|---|---|
| CN | 1393510 A | 1/2003 |
| CN | 1403540 A | 3/2003 |
| CN | 1721510 A | 1/2006 |
| CN | 1766043 A | 5/2006 |
| CN | 101591562 A | 12/2009 |
| CN | 101850226 A | 10/2010 |
| CN | 102051213 A | 5/2011 |
| CN | 103509594 A | 1/2014 |
| CN | 103540346 A | 1/2014 |
| CN | 102337154 B | 12/2014 |
| CN | 104371756 A | 2/2015 |
| CN | 103666527 B | 7/2015 |
| CN | 103666528 B | 7/2015 |
| CN | 105505460 A | 4/2016 |
| CN | 107235821 A | 10/2017 |
| CN | 107961744 A | 4/2018 |
| JP | 2009530436 A | 8/2009 |
| JP | 2011513558 A | 4/2011 |
| KR | 10-0651418 B1 | 11/2006 |
| KR | 20100132491 A | 12/2010 |
| RU | 2547152 C2 | 4/2015 |
| WO | 2012142723 A1 | 10/2012 |
| WO | 2017223310 A1 | 12/2017 |

\* cited by examiner

PROCESS AND SYSTEM FOR CATALYTIC CRACKING OF HYDROCARBON OILS

CROSS REFERENCE TO RELATED APPLICATIONS

This application is a divisional application of U.S. application Ser. No. 17/261,496, filed on Jan. 19, 2021, which is a U.S. national phase entry of International Application PCT/CN2019/095950, filed on Jul. 15, 2019, which claims the priority of the Chinese patent Application No. 201810779819.0, titled "Process and system for catalytic cracking using dilute-phase transport fluidized bed and fast fluidized bed", filed on Jul. 16, 2018, the content of each is incorporated herein by reference in its entirety.

TECHNICAL FIELD

The present application relates to the technical field of catalytic cracking, particularly to a process and system for catalytic cracking of hydrocarbon oils.

BACKGROUND ART

Light olefins, such as ethylene and propylene, are basic raw materials of chemical industry. In domestic and abroad, natural gas or light petroleum fraction is mostly used as raw material to produce light olefins by steam cracking process in ethylene complex unit. Benzene, toluene, and xylene (BTX) are important basic chemical raw materials, in which para-xylene (PX) accounts for about 45% of the total BTX consumption. With the development of industries such as polyester industry in China, the demand for BTX is expected to continue to increase at a high rate. About 90% of ethylene, about 70% of propylene, 90% of butadiene, and 30% of aromatics come from steam cracking as by-products. Although the steam cracking technology has been developed for decades and the technology is continuously improved, the steam cracking technology still has the technical limitations of high energy consumption, high production cost, large $CO_2$ emission, difficulty in adjustment of product distribution and the like. Where the traditional route for producing ethylene and propylene by steam cracking is adopted in petrochemical industry, a plurality of restriction factors may be faced, including shortage of light feedstock oil, insufficient production capacity, high cost and the like. In addition, as the raw materials for steam cracking become lighter, the reduction of the yield of propylene and light aromatics intensifies the supply and demand contradiction. Catalytic cracking technology can be used as a beneficial supplement to the production process for producing light olefins and light aromatics, and can provide obvious social and economic benefits when used for the production of chemical raw materials in oil refining and chemical engineering integrated enterprises.

Chinese patent application publication No. CN1234426A discloses a process for simultaneously producing light olefins and high-aromatic gasoline from heavy oil, which comprises subjecting heavy petroleum hydrocarbon and steam to catalytic cracking reaction in a composite reactor composed of a riser reactor and a dense-phase fluidized bed, so as to increase the yield of light olefins, especially propylene, and increase the aromatic content in gasoline to about 80 wt %.

Chinese patent application publication No. CN1393510A discloses a process for improving the production of ethylene and propylene by catalytic conversion of heavy petroleum hydrocarbon, which comprises contacting and reacting a hydrocarbon oil feedstock with a catalyst comprising high-silica pentasil zeolite in a riser or fluidized bed reactor. The process can not only increase the yield of ethylene and propylene, but also alleviate the hydrothermal deactivation of the catalyst to some extent.

Chinese patent application publication No. CN1721510A discloses a process for producing light olefins and aromatics by catalytic cracking in two reaction zones, in which different weight hourly space velocities are adopted in the two reaction zones for the purpose of producing light olefins such as propylene and ethylene from heavy feedstocks to the maximum extent, with a propylene yield exceeding 20 wt %, and simultaneously producing aromatics such as toluene and xylene.

U.S. patent application publication Nos. US2002003103A and US2002189973A disclose a FCC unit comprising dual riser reactors for improving the production of propylene, in which gasoline (60-300° F./15-150° C.) produced by the cracking reaction is fed to a second riser reactor for further reaction, and the catalyst is a mixture of USY molecular sieve catalyst and ZSM-5 molecular sieve catalyst.

U.S. patent application publication No. US2002195373A and International patent application publication No. WO2017223310A disclose processes carried out using a downflow reactor operating at a high temperature (1020-1200° F./550-650° C.), a short contact time (<0.5 seconds), and a high catalyst-to-oil ratio (15-25). The primary catalyst (Y-type faujasite) has low hydrogen transfer activity and is formulated to maximize the yield of light olefins in conjunction with operating conditions. A high efficiency separator is used to separate the product from the catalyst within 0.1 seconds, so as to minimize secondary reactions and coke generation. In addition, LCO is used to quench the separated gaseous product to about 930° F./500° C. and to prevent overcracking.

U.S. Pat. No. 6,538,169A and US patent application publication No. US2003121825A also disclose processes employing a reaction-regeneration system composed of two reaction zones and a common regenerator. In the first reaction zone, a heavy feedstock is cracked into light olefins or intermediates that can be converted to light olefins at a high temperature and a high catalyst-to-oil ratio. The second reaction zone is composed of a second riser reactor, where the operating conditions are more severe and more light components are produced from the gasoline product. A shape-selective molecular sieve, such as ZSM-5, is used to facilitate the conversion of gasoline to light olefins, and suitable feedstocks include VGO, HVGO and hydrogenated gas oil.

Chinese patent application publication No. CN1403540A discloses a catalytic conversion process for producing ethylene and propylene, in which a reactor composed of a riser reactor and a dense-phase fluidized bed connected in series is used, a light feedstock is injected into the riser reactor to react under highly severe conditions, and the reaction product and coke-deposited catalyst are passed to the fluidized bed for further reaction under relatively mild conditions. The process can provide relatively higher total yield of ethylene, propylene, and butene.

Chinese patent application publication No. CN102051213A discloses a catalytic cracking process, which comprises the steps of contacting a heavy feedstock with a catalyst in a first riser reactor comprising at least two reaction zones for cracking reaction, and contacting a light feedstock and cracked heavy oil with a catalyst in a second riser reactor and a fluidized bed reactor for cracking reaction. When used for catalytic cracking of heavy oils, the process can provide a high heavy oil conversion rate and propylene yield, and a low yield of dry gas and coke.

The structural contradiction of the oil refining chemical industry is increasingly serious. On one hand, the excessive production of traditional petrochemical products and the contradiction between the supply and the demand of finished oils are prominent. On the other hand, the shortage of resource products and high-end petrochemical products is also prominent. Thus, the transformation of oil refining to chemical industry is an irresistable trend. Catalytic cracking units serve as bridges between oil refining and chemical industry face unprecedented pressure and challenge. At present, the proportion of atmospheric residuum oil blended in feedstock for catalytic cracking units is getting larger and larger, and there is even a proposal of blending vacuum residuum oil. Existing catalytic cracking technology usually takes vacuum gas oil or paraffin-based atmospheric residuum oil as a feedstock, and the most advanced catalytic cracking technology adopts a reactor composed of double riser reactors or a riser reactor connected in series with a dense bed under highly severe conditions, for the propose of producing more light olefins and/or light aromatics. A problem of high yield of dry gas and coke inevitably occurs when such a reactor is used for processing residue-blended heavy oil. A decrease in coke yield can be achieved by using a downflow reactor, but the reaction conversion is relatively low and a specialized catalyst is required. As the feedstock becomes heavier, the demands for blending residual oil in the feedstock for catalytic cracking units are growing bigger. In order to efficiently utilize inferior heavy oil resources and meet the increasing demands of chemical raw materials such as light olefins and aromatics, it is necessary to develop a catalytic cracking process for converting the inferior heavy oil feedstock into high value-added products.

SUMMARY OF THE INVENTION

An object of the present application is to provide a novel process and system for catalytic cracking of hydrocarbon oils, which are particularly suitable for use in the production of light olefins such as ethylene and propylene from hydrocarbon oil feedstocks, particularly heavy feedstock oils through catalytic cracking. The process and system for catalytic cracking have the advantages of low yield of dry gas and coke, and good product distribution.

To achieve the above object, in one aspect, the present application provides a process for catalytic cracking of hydrocarbon oils, comprising the step of contacting a hydrocarbon oil feedstock, particularly a heavy feedstock oil, with a catalytic cracking catalyst for reaction in a reactor comprising a dilute-phase transport fluidized bed and a fast fluidized bed connected in series, wherein, in the fast fluidized bed, the axial solid fraction $\varepsilon$ of the catalyst is controlled within the range of about 0.1 to about 0.2.

In another aspect, the present application provides a system useful for catalytic cracking of hydrocarbon oils, particularly heavy feedstock oils, comprising a catalytic cracking reactor, a catalyst separation device, an optional reaction product separator, and a regenerator,
wherein the catalytic cracking reactor comprises a dilute-phase transport fluidized bed and a fast fluidized bed connected in series, with the dilute-phase transport fluidized bed being in fluid communication with the fast fluidized bed and disposed at the upstream of the fast fluidized bed, along the flow direction of the reaction stream;
the dilute-phase transport fluidized bed is provided with a catalyst inlet at the bottom and a first feedstock inlet at the lower part, the fast fluidized bed is provided with an outlet at the top and an optional second feedstock inlet at the bottom, the catalyst separation device is provided with an inlet, a catalyst outlet and a reaction product outlet, the optional reaction product separator is provided with a reaction product inlet, a dry gas outlet, a LPG outlet, a gasoline outlet, a diesel oil outlet and a slurry outlet, and the regenerator is provided with a catalyst inlet and a catalyst outlet,
the catalyst inlet of the dilute-phase transport fluidized bed is in fluid communication with the catalyst outlet of the regenerator, the outlet of the fast fluidized bed is in fluid communication with the inlet of the catalyst separation device, the reaction product outlet of the catalyst separation device is in fluid communication with the reaction product inlet of the optional reaction product separator, and the catalyst outlet of the catalyst separation device is in fluid communication with the catalyst inlet of the regenerator.

According to the present application, the catalyst density in the fast fluidized bed can be effectively improved by controlling the axial solid fraction $\varepsilon$ of the catalyst in the fast fluidized bed within the range of about 0.1 to about 0.2, so that the ratio of the catalyst to the hydrocarbon oil feedstock at the moment of reaction is greatly improved, and relatively long hydrocarbon and catalyst residence time is obtained, and thereby sufficient contact and reaction between the catalyst and the hydrocarbon oil feedstock, particularly inferior heavy oil, can be achieved. As a result, the reaction conversion rate can be improved, the yield of light olefins and light aromatics can be increased, and the generation of dry gas and coke can be effectively reduced at the same time, so that the product distribution and the product quality are improved.

Further, in the present application, the catalyst-to-oil ratio can be adjusted over a wide range by introducing a supplementary catalyst into the fast fluidized bed, providing more active sites for the cracking reaction. Meanwhile, by the introduction of the supplementary catalyst, the flexibility of the adjustment of reaction temperature can be enhanced, and the gradient of the temperature and the catalyst activity in the fast fluidized bed can be effectively adjusted.

By using the process and system according to the present application, chemical raw materials with high added values can be produced from cheap inferior heavy oils in petrochemical enterprises to the maximum extent, the refining and chemical integration process of oil refining enterprises can be promoted, the shortage of petrochemical raw materials can be solved, and the economic and social benefits of the petrochemical industry can be improved.

Other characteristics and advantages of the present application will be described in detail in the Detailed Description hereinbelow.

BRIEF DESCRIPTION OF THE DRAWINGS

The drawings, forming a part of the present description, are provided to help the understanding of the present application, and should not be considered to be limiting. The present application can be interpreted with reference to the drawings in combination with the Detailed Description hereinbelow. In the drawings.

Figure 1:
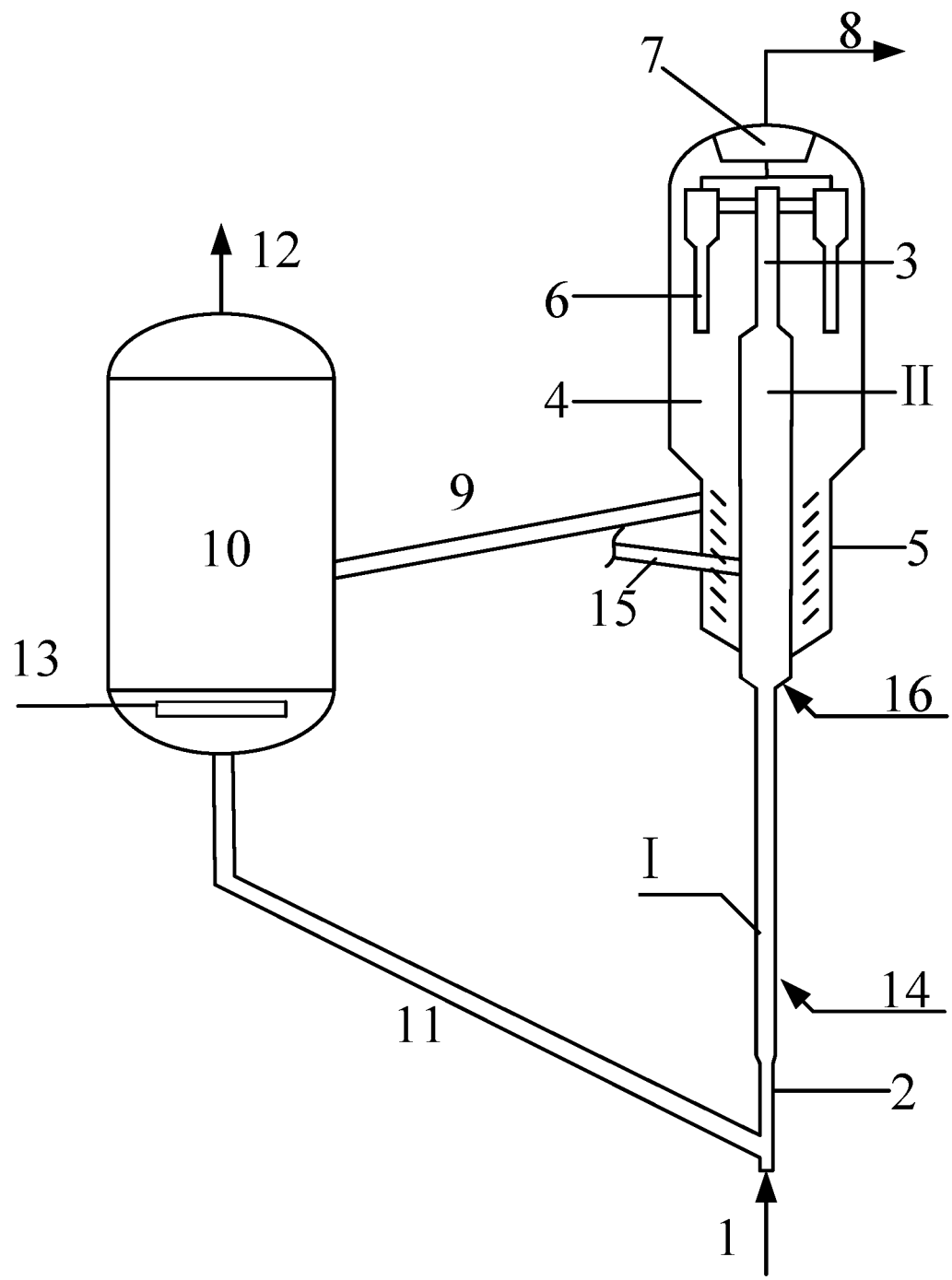
FIG. 1 is a schematic diagram of a preferred embodiment of the present application.

| Description of the reference numerals |
| --- |
| I Dilute-phase transport fluidized bed |
| II Fast fluidized bed |
| 1 Pre-lifting medium pipeline |
| 2 Pre-lifting section |
| 3 Outlet section |
| 4 Disengager |
| 5 Stripper |
| 6 Cyclone |
| 7 Plenum chamber |
| 8 Reactor vapor pipeline |
| 9 Spent catalyst standpipe |
| 10 Regenerator |
| 11 Regenerated catalyst standpipe |
| 12 Flue gas pipeline |
| 13 Air distributor |
| 14 First feed line |
| 15 Complement pipeline |
| 16 Second feed line |
| 17 Full dense-phase reaction zone |
| 18 Transition section |

DETAILED DESCRIPTION OF THE INVENTION

The present application will be further described hereinafter in detail with reference to specific embodiments thereof and the accompanying drawings. It should be noted that the specific embodiments of the present application are provided for illustration purpose only, and are not intended to be limiting in any manner.

Any specific numerical value, including the endpoints of a numerical range, described in the context of the present application is not restricted to the exact value thereof, but should be interpreted to further encompass all values close to said exact value, such as all possible values within ±5% of the exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

In the present application, the dilute-phase transport fluidized bed and the fast fluidized bed constitute two reaction zones connected in series of the reactor, and may therefore also be referred to as dilute-phase transport fluidized bed reaction zone and fast fluidized bed reaction zone, respectively.

In the present application, the term "dilute-phase transport fluidized bed" has the same meaning well known to those skilled in the art, and specifically refers to a fluidized bed in which catalyst particles form a dilute phase in suspension in a fluid and will be entrained by the fluid exiting the fluidized bed.

In the present application, the term "fast fluidized bed" has the same meaning well known to those skilled in the art, and particularly refers to a fluidized bed in which catalyst particles are present in a fast fluidized state. The fast fluidized state is a gas-solid contact fluidized state without bubbles, of which the important characteristic is that solid particles tend to move in clusters. When the catalyst is present in a fast fluidized state, the axial solid fraction $\varepsilon$ of the catalyst in the fluidized bed is generally in the range of about 0.05 to about 0.4. However, in conventional fast fluidized beds, the catalyst is typically distributed in a dilute-to-dense pattern from top to bottom, for example the axial solid fraction $\varepsilon$ of the catalyst in the upper part may be in the range of about 0.05 to about 0.1, and the axial solid fraction $\varepsilon$ of the catalyst in the lower part may be in the range of about 0.3 to about 0.4.

According to the present application, in the fast fluidized bed, when the axial solid fraction $\varepsilon$ of the catalyst is controlled within the range of about 0.1 to about 0.2 from bottom to top (i.e., the axial solid fractions $\varepsilon$ of the catalyst measured in the upper, middle and lower parts of the reaction zone divided equally in the axial direction are each not less than about 0.1 and not greater than about 0.2), the catalyst is distributed in a quasi-uniform full dense-phase pattern throughout the fast fluidized bed. Accordingly, a fast fluidized reaction zone in which the catalyst is distributed in such a full dense-phase pattern may be referred to as a "full dense-phase reaction zone".

In the present application, the term "water-to-oil weight ratio" refers to the ratio of the total weight of steam injected into the reactor to the weight of the feedstock.

In the present application, the terms "upstream" and "downstream" are used with reference to the flow direction of the reaction stream. For example, when the reaction stream flows from bottom to top, said "upstream" refers to a lower position, and said "downstream" refers to a higher position.

Unless otherwise stated, the terms used herein have the same meaning as commonly understood by those skilled in the art; and if the terms are defined herein and their definitions are different from the ordinary understanding in the art, the definition provided herein shall prevail.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to those skilled in the art that such a combination is obviously unreasonable.

All of the patent and non-patent documents cited herein, including but not limited to textbooks and journal articles, are hereby incorporated by reference in their entirety.

In a first aspect, the present application provides a process for catalytic cracking of hydrocarbon oils, comprising the step of contacting a hydrocarbon oil feedstock, particularly a heavy feedstock oil, with a catalytic cracking catalyst for reaction in a reactor comprising a dilute-phase transport fluidized bed and a fast fluidized bed connected in series, wherein, in the fast fluidized bed, the axial solid fraction $\varepsilon$ of the catalyst is controlled within the range of about 0.1 to about 0.2.

In a preferred embodiment, the process according to the present application is used for the production of light olefins, such as ethylene and propylene, from heavy feedstock oil, and further comprises the steps of:
  i) contacting a first feedstock comprising a light feedstock and/or a heavy feedstock oil with a catalytic cracking catalyst in a dilute-phase transport fluidized bed to carry out a first catalytic cracking reaction; and ii) subjecting the reaction effluent from step i) and optionally a second feedstock comprising a light feedstock and/or a heavy feedstock oil to a second catalytic cracking reaction in a fast fluidized bed, wherein the light feedstock is selected from the group consisting of a C4 hydrocarbon fraction, a C5-C6 light gasoline fraction, and combinations thereof, and at least one of the first and second feedstocks comprises the heavy feedstock oil;

wherein, in the fast fluidized bed, the axial solid fraction ε of the catalyst is controlled within the range of about 0.1 to about 0.2.

According to the present application, the axial solid fraction ε of the catalyst in the fast fluidized bed is controlled within the range of about 0.1 to about 0.2 from bottom to top, so that the catalyst is prevented from being distributed in a dilute-to-dense pattern in the fast fluidized bed from top to bottom, the real catalyst-to-oil ratio is kept consistent in the fast fluidized bed from top to bottom, the yield of dry gas and coke can be reduced, and the yield of the desired product can be improved.

In a further preferred embodiment, the process according to the present application further comprises the steps of:

i) contacting the first feedstock with the catalytic cracking catalyst in the dilute-phase transport fluidized bed to carry out the first catalytic cracking reaction;

ii) subjecting the reaction effluent from step i) and optionally the second feedstock to the second catalytic cracking reaction in the fast fluidized bed under conditions effective to produce light olefins, wherein the axial solid fraction ε of the catalyst in the fast fluidized bed is controlled within the range of about 0.1 to about 0.2;

iii) separating the reaction effluent from the reactor to obtain a reaction product rich in light olefins and a spent catalyst;

iv) regenerating the spent catalyst and recycling at least a portion of the resulting regenerated catalyst to step i) as the catalytic cracking catalyst; and v) optionally, separating the reaction product to obtain dry gas, liquefied petroleum gas, gasoline, diesel oil and slurry.

As used herein, said "effective to produce light olefins" means at least a portion of the feedstock undergoes effective cracking, e.g., deep catalytic cracking, in the fast fluidized bed to produce light olefin products, such as ethylene and propylene, thereby providing a product mixture rich in light olefins.

As used herein, said "rich in light olefins" means the total content of light olefins (e.g., ethylene and propylene) in the reaction product or product mixture is greater than about 10 wt %, preferably greater than about 15 wt %, and more preferably greater than about 20 wt %, of the reaction product or product mixture.

In some embodiments, prior to said step i) and/or after said step ii), the process according to the present application may further comprise one or more additional reaction steps, such as catalytic cracking and/or catalytic isomerization, carried out in an additional fluidized bed reaction zone, such as a dilute-phase transport fluidized bed, a dense-phase fluidized bed, a conventional fast fluidized bed, and the like.

In some other embodiments, the process according to the present application does not comprise any additional reaction step prior to said step i) or after said step ii).

In some particularly preferred embodiments, the process according to the present application further comprises the steps of:

i) introducing a first feedstock comprising a preheated inferior heavy oil into a lower part of the dilute-phase transport fluidized bed to contact with the catalytic cracking catalyst, and subjecting it to a first catalytic cracking reaction while passing through the dilute-phase transport fluidized bed from bottom to top, to obtain a reaction effluent comprising a first reaction product and a semi-spent catalyst;

ii) introducing the reaction effluent from step i) into the bottom of the fast fluidized bed and subjecting it to a second catalytic cracking reaction, together with an optional second feedstock comprising a light feedstock introduced from the bottom of the fast fluidized bed, while passing through the fast fluidized bed from bottom to top, to obtain a reaction effluent comprising a second reaction product and a spent catalyst, wherein the axial solid fraction c of the catalyst in the fast fluidized bed is controlled to satisfy: $0.1 \leq \varepsilon \leq 0.2$;

iii) separating the second reaction product from the spent catalyst in the reaction effluent from step ii);

iv) sending the spent catalyst to the regenerator for regeneration by coke burning, and recycling at least a portion of the resulting regenerated catalyst to the step i) as the catalytic cracking catalyst; and v) optionally, separating the resulting second reaction product to obtain dry gas, liquefied petroleum gas, gasoline, diesel oil and slurry.

In some other particularly preferred embodiments, the process according to the present application further comprises the steps of:

i) introducing a first feedstock comprising a light feedstock into a lower part of the dilute-phase transport fluidized bed to contact with the catalytic cracking catalyst, and subjecting it to a first catalytic cracking reaction while passing through the dilute-phase transport fluidized bed from bottom to top, to obtain a reaction effluent comprising a first reaction product and a semi-spent catalyst;

ii) introducing the reaction effluent from step i) into the bottom of the fast fluidized bed, and subjecting it to a second catalytic cracking reaction, together with a second feedstock comprising a preheated inferior heavy oil introduced from the bottom of the fast fluidized bed, while passing through the fast fluidized bed from bottom to top, to obtain a reaction effluent comprising a second reaction product and a spent catalyst, wherein the axial solid fraction c of the catalyst in the fast fluidized bed is controlled to satisfy: $0.1 \leq \varepsilon \leq 0.2$;

iii) separating the second reaction product from the spent catalyst in the reaction effluent from step ii);

iv) sending the spent catalyst to the regenerator for regeneration by coke burning, and recycling at least a portion of the resulting regenerated catalyst to the step i) as the catalytic cracking catalyst; and v) optionally, separating the resulting second reaction product to obtain dry gas, liquefied petroleum gas, gasoline, diesel oil and slurry.

In a preferred embodiment, the process according to the present application further comprises: introducing one or more streams of supplementary catalyst into the fast fluidized bed, and contacting the supplementary catalysts with the material in the fast fluidized bed to carry out a catalytic cracking reaction.

According to the present application, the one or more streams of supplementary catalyst may each independently have a carbon content of about 0-1.0 wt %. For example, the one or more streams of supplementary catalyst may each independently be selected from regenerated catalysts, spent catalysts, and semi-regenerated catalysts, i.e., regenerated, spent, and semi-regenerated catalytic cracking catalysts.

According to the present application, the total amount of the one or more streams of supplementary catalyst may account for about 0-50 wt %, preferably about 5-30 wt %, of the catalyst circulation rate of the reactor.

According to the present application, the one or more streams of supplementary catalyst are each independently introduced at a position with a distance from the bottom of the fast fluidized bed of about 0-90% of the total height thereof. Preferably, the one or more streams of supplementary catalyst are each independently introduced at about 20-80%, more preferably about 30-75%, of the height of the fast fluidized bed. For example, the introduction position may be at the bottom of the fast fluidized bed, or at about ⅓ of the total height of the fast fluidized bed. The temperature of the supplementary catalyst can be adjusted according to the desired reaction temperature, for example, cold and/or hot regenerated catalyst can be introduced, or cold and/or hot spent catalyst can be introduced.

According to the present application, by the introduction of the supplementary catalyst into the fast fluidized bed, the catalyst-to-oil ratio can be adjusted in a wider range, and more active sites can be provided for the cracking reaction. Meanwhile, by the introduction of the supplementary catalyst, the flexibility of the adjustment of reaction temperature can be enhanced, and the gradient of the temperature and the catalyst activity in the fast fluidized bed can be effectively adjusted. In addition, by the introduction of the supplementary catalyst into the fast fluidized bed, the uniformity of the catalyst density in the fluidized bed can be maintained as much as possible, the distribution of the catalyst density can be effectively adjusted, so that the cracking reaction can be ensured to be fully and effectively carried out, and the selectivity of the desired product can be improved.

According to the present application, the catalyst distribution within the fast fluidized bed can be further adjusted by adjusting the vapor velocity in the fast fluidized bed, and/or providing a catalyst distribution plate in the fast fluidized bed, thereby allowing the catalyst to be distributed in a quasi-uniform full dense-phase pattern.

According to the present application, the hydrocarbon oil feedstock, such as a heavy feedstock oil, particularly an inferior heavy oil, may be introduced into the reactor comprising a dilute-phase transport fluidized bed and a fast fluidized bed at one or more positions. For example, the hydrocarbon oil feedstock may be introduced into the dilute-phase transport fluidized bed entirely at one injection position, or into the fast fluidized bed entirely at one injection position. Optionally, the hydrocarbon oil feedstock may be introduced into the dilute-phase transport fluidized bed and/or the fast fluidized bed at two or more injection positions in the same or different proportions. For example, a portion of the hydrocarbon oil feedstock may be introduced into the dilute-phase transport fluidized bed at one injection position and another portion of the hydrocarbon oil feedstock may be introduced into the fast fluidized bed at another injection position, or the hydrocarbon oil feedstock may be introduced into the dilute-phase transport fluidized bed at two or more injection positions, or the hydrocarbon oil feedstock may be introduced into the fast fluidized bed at two or more injection positions.

According to the present application, the inferior heavy oil refers to a heavy oil that is less useful for catalytic cracking processing than conventional heavy oils. For example, the properties of the inferior heavy oil may satisfy at least one, such as one, two, three, or four, of the following criteria: a density at 20° C. of about 900-1000 kg/m³, preferably about 910-940 kg/l m 3; a carbon residue of about 2-10 wt %, preferably about 3-8 wt %; a total nickel and vanadium content of about 2-30 ppm, preferably about 5-20 ppm; a characterization factor K of less than about 12.1, preferably less than about 12.0. The carbon residue in the inferior heavy oil is measured by the Conradson carbon residue test method according to ASTMD-189.

For example, the inferior heavy oil may be heavy petroleum hydrocarbons and/or other mineral oils; the heavy petroleum hydrocarbon may be selected from the group consisting of vacuum residuum (VR), inferior atmospheric residuum (AR), inferior hydrogenated residuum, coker gas oil, deasphalted oil, vacuum gas oil, high acid value crude oil, high metal crude oil, and combinations thereof; said other mineral oil may be selected from the group consisting of coal liquefaction oil, oil sand bitumen, shale oil, and combinations thereof.

The catalytic cracking catalyst used herein is not particularly limited, and may be, for example, various catalytic cracking catalysts known to those skilled in the art suitable for producing light olefins from hydrocarbon oil feedstocks, such as heavy feedstock oils. In a preferred embodiment, the catalytic cracking catalyst comprises, based on the dry weight of the catalytic cracking catalyst, from about 1% to about 50%, preferably from about 5% to about 45%, more preferably from about 10% to about 40%, by weight of a zeolite, from about 5% to about 99%, preferably from about 10% to about 80%, more preferably from about 20% to about 70%, by weight of an inorganic oxide, and from about 0% to about 70%, preferably from about 5% to about 60%, more preferably from about 10% to about 50%, by weight of a clay; the zeolite, as an active component, may comprise a mesopore zeolite and optionally a macropore zeolite.

Preferably, the mesopore zeolite may account for about 0-50 wt %, preferably about 0-20 wt %, of the total weight of the zeolite on a dry weight basis.

In the present application, the mesopore and macropore zeolites are as commonly known in the art, i.e., the mesopore zeolite has an average pore size of about 0.5-0.6 nm and the macropore zeolite has an average pore size of about 0.7-1.0 nm.

For example, the macropore zeolite may be one or more selected from the group consisting of rare earth exchanged Y-type (REY) zeolites, rare earth exchanged H-Y type (REHY) zeolites, and ultrastable Y-type zeolites and high-silica Y-type zeolites obtained by different methods. The mesopore zeolite may be selected from zeolites having the MFI structure, such as ZSM zeolites and/or ZRP zeolites. Optionally, the mesopore zeolite may be modified with a nonmetallic element such as phosphorus and/or a transition metal element such as iron, cobalt, nickel. A more detailed description of ZRP zeolites can be found in U.S. Pat. No. 5,232,675A. The ZSM zeolite is preferably a mixture of one or more selected from ZSM-5, ZSM-11, ZSM-12, ZSM-23, ZSM-35, ZSM-38, ZSM-48 and other zeolites of similar structure. A more detailed description of ZSM-5 can be founded in U.S. Pat. No. 3,702,886A.

According to the present application, the inorganic oxide, as a binder, is preferably silicon dioxide ($SiO_2$) and/or aluminum oxide ($Al_2O_3$). The clay, as a matrix (i.e., carrier), is preferably kaolin and/or halloysite.

The catalytic cracking reaction conditions used herein are not strictly limited, and may be, for example, those well known to those skilled in the art suitable for producing light olefins from hydrocarbon oil feedstocks, such as heavy feedstock oils. In a preferred embodiment, the conditions for the first catalytic cracking reaction may include: a reaction temperature of about 500-600° C., a reaction time of about 0.05-5 seconds, a catalyst-to-oil weight ratio of about 1:1 to about 50:1, a water-to-oil weight ratio of about 0.03:1 to about 0.5:1, a catalyst density of about 20-100 kg/m$^3$, a vapor velocity of about 4-18 m/s, a reaction pressure of about 130-450 kPa, and a catalyst mass flow rate, $G_s$, of about 180-500 kg/(m$^2$·sec). Further preferably, the conditions for the first catalytic cracking reaction may include: a reaction temperature of about 520-580° C., a reaction time of about 1-3 seconds, a catalyst-to-oil weight ratio of about 5:1 to about 25:1, a water-to-oil weight ratio of about 0.05:1 to about 0.3:1.

In a preferred embodiment, the conditions for the second catalytic cracking reaction may include: a reaction temperature of about 510-650° C., a reaction time of about 1-20 seconds, a catalyst-to-oil weight ratio of about 3:1 to about 50:1, a water-to-oil weight ratio of about 0.03:1 to about 0.8:1, a catalyst density of about 120-290 kg/m$^3$, a vapor velocity of about 0.8-2.5 m/s, a reaction pressure of about 130-450 kPa, and a catalyst mass flow rate, $G_s$, of about 15-150 kg/(m$^2$·sec). Further preferably, the conditions for the second catalytic cracking reaction may include: a reaction temperature of about 550-620° C., a reaction time of about 3-15 seconds, a catalyst-to-oil weight ratio of about 10:1 to about 30:1, a water-to-oil weight ratio of about 0.05:1 to about 0.5:1, a catalyst density of about 150-250 kg/m$^3$, a vapor velocity of about 1-1.8 m/s, a reaction pressure of about 130-450 kPa, and a catalyst mass flow rate, $G_s$, of about 20-130 kg/(m$^2$·sec).

According to the present application, the separation of the reaction product from the spent catalyst can be carried out in a manner known to those skilled in the art, for example in a disengager using a cyclone. The manner of further separating the reaction product to obtain dry gas, liquefied petroleum gas, gasoline, diesel oil and slurry is also well known to those skilled in the art. In a preferred embodiment, the dry gas and the liquefied petroleum gas can be further separated by separation means commonly used in the art to obtain a desired product, such as ethylene, propylene, and the like.

In a preferred embodiment, the process according to the present application further comprises: introducing a C4 hydrocarbon fraction and/or a C5-C6 light gasoline fraction as the light feedstock of said first and/or second feedstocks into said fast fluidized bed and/or dilute-phase transport fluidized bed at one or more positions for catalytic cracking reactions. For example, in some preferred embodiments, at least one of the first and second feedstocks comprises a light feedstock selected from the group consisting of a C4 hydrocarbon fraction, a C5-C6 light gasoline fraction, and combinations thereof. In some further preferred embodiments, the first feedstock comprises a light feedstock and a heavy feedstock oil, and at least a portion of the light feedstock is introduced into the dilute-phase transport fluidized bed upstream of the position where the heavy feedstock oil is introduced into the dilute-phase transport fluidized bed. In yet still further preferred embodiments, the first feedstock comprises a heavy feedstock oil, such as an inferior heavy oil, and the second feedstock comprises the light feedstock. In yet still further preferred embodiments, the first feedstock comprises the light feedstock and the second feedstock comprises a heavy feedstock oil, such as an inferior heavy oil.

According to the present application, the "C4 hydrocarbon fraction" refers to a light hydrocarbon fraction present in a gaseous form at normal temperature and pressure that comprises C4 fraction as a main component, including alkanes, alkenes and alkynes having 4 carbon atoms in molecule. It may include gaseous hydrocarbon products (e.g. liquefied petroleum gas) produced by the process according to the present application enriched in C4 hydrocarbon fractions, or gaseous hydrocarbons produced by other units enriched in C4 fractions, preferably C4 hydrocarbon fractions produced by the process according to the present application. The C4 hydrocarbon fraction is preferably an olefin-rich C4 hydrocarbon fraction, which may have a C4 olefin content of greater than about 50 wt %, preferably greater than about 60 wt %, more preferably above about 70 wt %.

According to the present application, the "C5-C6 light gasoline fraction" refers to a component of gasoline having a carbon number of C5-C6, which may include a cracking gasoline produced by the process according to the present application and may also include gasoline fractions produced by other units, such as at least one C5-C6 fraction selected from the group consisting of deep catalytic cracking gasoline, catalytic cracking gasoline, straight run gasoline, coker gasoline, thermal cracking gasoline and hydrogenated gasoline.

According to the present application, the spent catalyst may be regenerated by means well known to those skilled in the art, for example regenerated in a regenerator by coke burning. Specifically, an oxygen-containing gas such as air may be introduced into the regenerator to contact with the spent catalyst. Flue gas obtained by regeneration via coke burning can be separated from the catalyst in the regenerator and then sent to a subsequent energy recovery system.

In some preferred embodiments of the present application, the regenerated catalyst obtained after regeneration via coke burning in the regenerator may be cooled to about 600-680° C. by a catalyst cooler before being recycled to the reactor. The recycle of the hot regenerated catalyst to the reactor after being cooled is beneficial to reducing the contact temperature of the oil and the catalyst, improving the contact state of the feedstock oil and the catalyst and further improving the selectivity to dry gas and coke generation.

In some preferred embodiments, the fast fluidized bed comprises a full dense-phase reaction zone and a transition section from bottom to top, the full dense-phase reaction zone is in the form of an equal-diameter or varied-diameter hollow column with a roughly circular cross section, an open bottom end and an open top end, the dilute-phase transport fluidized bed is in communication with the bottom end of the full dense-phase reaction zone, the top end of the full dense-phase reaction zone is in communication with the outlet section of the reactor through the transition section, the bottom of the full dense-phase reaction zone is optionally provided with one or more inlets for feeding the second feedstock, wherein the cross-sectional diameter of the bottom end of the full dense-phase reaction zone is greater than or equal to the diameter of the dilute-phase transport fluidized bed and the cross-sectional diameter of the top end of the full dense-phase reaction zone is greater than the diameter of the outlet section, and the bottom or the side wall of the full dense-phase reaction zone is provided with one or more inlets for supplementary catalyst, each independently disposed at about 0-90%, preferably about 20-80%, more preferably about 30-75%, of the total height of the fast fluidized bed.

According to the present application, the full dense-phase reaction zone can be in the form of an equal-diameter or varied-diameter hollow column with a roughly circular cross section, an open bottom end and an open top end, such as an equal-diameter hollow cylinder or a hollow column having a diameter increases continuously or discontinuously from bottom to top.

According to the present application, by "diameter increases continuously" is meant that the diameter increases continuously in a linear or non-linear manner. As an example of the "hollow column having a diameter increases continuously from bottom to top", an inverted hollow truncated cone can be mentioned.

According to the present application, by "diameter increases discontinuously" is meant that the diameter increases in a discontinuous manner, for example increases stepwise. As an example of the "hollow column having a diameter increases discontinuously from bottom to top", a hollow column constituted by two or more cylinder sections with successively increased diameters can be mentioned.

For example, the full dense-phase reaction zone may be in the form of a hollow cylinder, an inverted hollow truncated cone, a hollow column constituted by two or more cylinder sections with successively increased diameters, a hollow column constituted by two or more sections of inverted truncated cones with successively increased diameters, or a hollow column constituted by one or more cylinder sections and one or more sections of inverted truncated cones.

In some preferred embodiments, the bottom of the full dense-phase reaction zone is provided with a catalyst distribution plate.

In some preferred embodiments, the bottom of the full dense-phase reaction zone is provided with one or more second feedstock inlets, and preferably, a gas distributor is provided at the position of the second feedstock inlet.

In a preferred embodiment, the ratio of the diameter of the maximum cross-section of the full dense-phase reaction zone to the total height of the fast reaction bed is about 0.005:1 to about 1:1, preferably about 0.01:1 to about 0.8:1, more preferably about 0.05:1 to about 0.5:1; the ratio of the height of the full dense-phase reaction zone to the total height of the fast reaction bed is about 0.1:1 to about 0.9:1, preferably about 0.3:1 to about 0.85:1, more preferably about 0.5:1 to about 0.8:1.

In some preferred embodiments, the full dense-phase reaction zone is in the form of an inverted hollow truncated cone with a longitudinal section of an isosceles trapezoid, which has a bottom cross-sectional diameter of about 0.2-10 meters, preferably about 0.5-8 meters, more preferably about 1-5 meters; a ratio of the top cross-sectional diameter to the bottom cross-sectional diameter of from greater than 1 to about 50, preferably from about 1.2 to about 10, more preferably from about 1.5 to about 5; a ratio of the diameter of the maximum cross-section to the total height of the fast reaction bed of about 0.005:1 to about 1:1, preferably about 0.01:1 to about 0.8:1, more preferably about 0.05:1 to about 0.5:1; a ratio of the height of the full dense-phase reaction zone to the total height of the fast reaction bed of about 0.1:1 to about 0.9:1, preferably about 0.3:1 to about 0.85:1, more preferably about 0.5:1 to about 0.8:1.

In some other preferred embodiments, the full dense-phase reaction zone is in the form of a hollow column consisting of a section of an inverted truncated cone and a cylinder section, preferably the truncated cone is located below the cylinder, wherein the truncated cone has a longitudinal section of an isosceles trapezoid, a bottom cross-sectional diameter of about 0.2-10 meters, preferably about 0.5-8 meters, more preferably about 1-5 meters; and a ratio of the top cross-sectional diameter to the bottom cross-sectional diameter of from greater than 1 to about 50, preferably about 1.2 to about 10, more preferably about 1.5 to about 5; the diameter of the cylinder is approximately the same as the diameter of the top cross section of the truncated cone, and the ratio of the height of the hollow cylinder to the height of the truncated cone is about 0.4:1 to about 2.5:1, preferably about 0.8:1 to about 1.5:1; the ratio of the diameter of the maximum cross-section of the full dense-phase reaction zone to the total height of the fast reaction bed is about 0.005:1 to about 1:1, preferably about 0.01:1 to about 0.8:1, more preferably about 0.05:1 to about 0.5:1; the ratio of the height of the full dense-phase reaction zone to the total height of the fast reaction bed is about 0.1:1 to about 0.9:1, preferably about 0.3:1 to about 0.85:1, more preferably about 0.5:1 to about 0.8:1.

In yet other preferred embodiments, the full dense-phase reaction zone is in the form of a hollow cylinder having a diameter of about 0.2-10 meters, preferably about 1-5 meters; the ratio of the diameter of the full dense-phase reaction zone to the total height of the fast reaction bed is about 0.005:1 to about 1:1, preferably about 0.01:1 to about 0.8:1, more preferably about 0.05:1 to about 0.5:1; the ratio of the height of the full dense-phase reaction zone to the total height of the fast reaction bed is about 0.1:1 to about 0.9:1, preferably about 0.3:1 to about 0.85:1, more preferably about 0.5:1 to about 0.8:1.

In a preferred embodiment, the full dense-phase reaction zone has a height of about 2-50 meters, preferably about 5-40 meters, and more preferably about 8-20 meters.

In a preferred embodiment, the ratio of the height of the transition section to the total height of the fast reaction bed is about 0.1:1 to about 0.9:1, preferably about 0.2:1 to about 0.5:1. it is further preferred that the transition section is in the form of a hollow truncated cone with a longitudinal section of an isosceles trapezium with sides having an internal inclination angle α of about 25-85°, preferably about 30-75°.

In some embodiments, the reactor employed in the present application may further comprise one or more additional fluidized bed reaction zones at the upstream of the dilute-phase transport fluidized bed and/or the downstream of the fast fluidized bed, such as a dilute-phase transport fluidized bed, a dense-phase fluidized bed, a conventional fast fluidized bed, and the like.

In some other embodiments, the reactor employed in the present application does not comprise any additional reaction zone at the upstream of the dilute-phase transport fluidized bed or the downstream of the fast fluidized bed.

In some embodiments, the reactor employed in the present application may be arranged coaxially with the disengager, or may be arranged in parallel with the disengager.

In a second aspect, the present application provides a system useful for catalytic cracking of hydrocarbon oils, particularly heavy feedstock oils, comprising a catalytic cracking reactor, a catalyst separation device, an optional reaction product separator, and a regenerator, wherein the catalytic cracking reactor comprises a dilute-phase transport fluidized bed and a fast fluidized bed connected in series, with the dilute-phase transport fluidized bed being in fluid communication with the fast fluidized bed and disposed at the upstream of the fast fluidized bed, along the flow direction of the reaction stream;

the dilute-phase transport fluidized bed is provided with a catalyst inlet at the bottom and a first feedstock inlet at the lower part, the fast fluidized bed is provided with an outlet at the top and an optional second feedstock inlet at the bottom, the catalyst separation device is provided with an inlet, a catalyst outlet and a reaction product outlet, the optional reaction product separator is provided with a reaction product inlet, a dry gas outlet, a liquefied pertroleum gas outlet, a gasoline outlet, a diesel oil outlet and a slurry outlet, and the regenerator is provided with a catalyst inlet and a catalyst outlet, the catalyst inlet of the dilute-phase transport fluidized bed is in fluid communication with the catalyst outlet of the regenerator, the outlet of the fast fluidized bed is in fluid communication with the inlet of the catalyst separation device, the reaction product outlet of the catalyst separation device is in fluid communication with the reaction product inlet of the optional reaction product separator, and the catalyst outlet of the catalyst separation device is in fluid communication with the catalyst inlet of the regenerator.

In a preferred embodiment, the fast fluidized bed and the dilute-phase transport fluidized bed are coaxially arranged one above the other, and the fast fluidized bed is disposed above the dilute-phase transport fluidized bed.

In some preferred embodiments, the fast fluidized bed is provided with a catalyst distribution plate, which may be disposed at the bottom of the fast fluidized bed, for example at the junction of the dilute-phase transport fluidized bed and the fast fluidized bed.

According to the present application, the catalyst distribution plate may be any type of distribution plate commonly used in the industry, such as one or more of flat, arched, dished, annular, and umbrella-shaped plates. The use of the catalyst distribution plate is beneficial to enabling the catalyst to contact with the feedstock oil at an uniform concentration along the axial direction of the full dense-phase reaction zone for catalytic cracking reaction, thereby reducing the generation of strippable coke and thermal reaction coke caused by an overhigh or overlow concentration of the catalyst.

In some preferred embodiments, the fast fluidized bed is provided with one or more inlets for the second feedstock at the bottom, preferably with a gas distributor at the position of the inlet.

In some preferred embodiments, the fast fluidized bed has a structure as described above, i.e., a structure comprising a full dense-phase reaction zone and a transition section sequentially from bottom to top. The detailed description of the specific arrangement of the full dense-phase reaction zone and the transition section will not be repeated here.

In some embodiments, the catalytic cracking reactor may further comprise one or more additional fluidized bed reaction zones, such as a dilute-phase transport fluidized bed, a dense-phase fluidized bed, a conventional fast fluidized bed, and the like, at the upstream of the dilute-phase transport fluidized bed and/or the downstream of the fast fluidized bed.

In some other embodiments, the catalytic cracking reactor does not comprise any additional reaction zone at the upstream of the dilute-phase transport fluidized bed or the downstream of the fast fluidized bed.

According to the present application, the catalyst separation device and the reaction product separator may be any device known to those skilled in the art. For example, the catalyst separation device may include a cyclone, a disengager, a stripper, and the like, and the reaction product separator may be a fractionator, and the like.

The present application will be further described with reference to preferred embodiments shown in the drawings, but the present application is not limited thereto.

FIG. 1 shows a preferred embodiment of the present application, in which a pre-lifting medium, which may be dry gas, steam or a mixture thereof, is introduced into the bottom of a dilute-phase transport fluidized bed I through the bottom of a pre-lifting section 2 via a pre-lifting medium pipeline 1. A regenerated catalyst from a regenerated catalyst standpipe 11 is introduced into the lower part of the pre-lifting section 2, then into the dilute-phase transport fluidized bed I, and moves upwards under the lifting action of the pre-lifting medium. A first feedstock comprising a C4 hydrocarbon fraction, a C5-C6 light gasoline fraction and/or a hydrocarbon oil feedstock, such as an inferior heavy oil, is injected into the lower part of the dilute-phase transport fluidized bed I through a first feed line 14, mixed and contacted with the catalyst in the dilute-phase transport fluidized bed I for a first catalytic cracking reaction, to obtain a reaction effluent comprising a first reaction product and a semi-spent catalyst. The reaction effluent moves upwards into the bottom of a fast fluidized bed II, is contacted with a supplementary catalyst, which may be a regenerated catalyst or spent catalyst, introduced via a complement pipeline 15 for a second catalytic cracking reaction. The complement pipeline 15 is connected to the fast fluidized bed II at about 0-90%, preferably about 20-80%, more preferably about 30-75%, of the height thereof. Optionally, a second feedstock comprising a C4 hydrocarbon fraction, a C5-C6 light gasoline fraction and/or a hydrocarbon oil feedstock, such as an inferior heavy oil, is passed into the bottom of the fast fluidized bed II via a second feed line 16. The reaction effluent comprising the second reaction product and the deactivated spent catalyst generated by the reaction is passed into a cyclone 6 in a disengager 4 through an outlet section 3, to separate the spent catalyst from the second reaction product. The separated second reaction product is introduced into a plenum chamber 7, and the reaction product in the plenum chamber 7 is passed into a subsequent product separation system (not shown) through a reactor vapor pipeline 8. Fine catalyst powders are returned to the disengager 4 through the dipleg of the cyclone 6, and the spent catalyst in the disengager 4 is passed to a stripper 5. The reaction product stripped from the spent catalyst is passed into the plenum chamber 7 after passing through the cyclone 6. The stripped spent catalyst is passed into a regenerator 10 through a spent catalyst standpipe 9, and air is introduced into the regenerator 10 after distribution through an air distributor 13 to burn off the coke on the spent catalyst in the dense bed at the bottom of the regenerator 10, so that the deactivated spent catalyst is regenerated to obtain a regenerated catalyst. The regenerated catalyst is recycled to the pre-lifting section 2 through the regenerated catalyst standpipe 11, and the flue gas is passed into a subsequent energy recovery system (not shown) through a flue gas pipeline 12.

Figure 2:
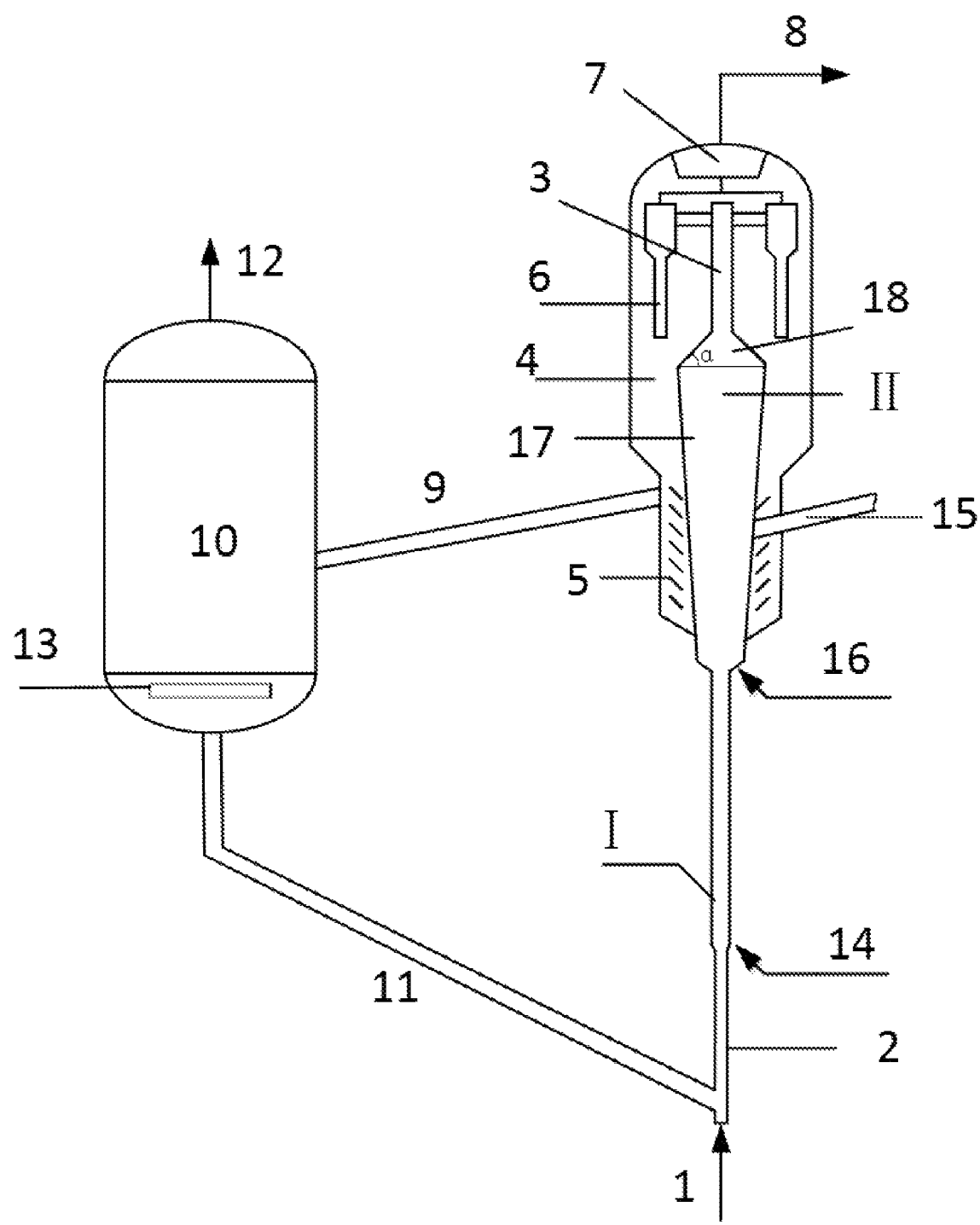
FIG. 2 is a schematic diagram of another preferred embodiment of the present application.

FIG. 2 shows another preferred embodiment of the present application, which is essentially identical to the embodiment shown in FIG. 1, except that the fast fluidized bed II comprises, from bottom to top, a full dense-phase reaction zone 17 and a transition section 18. The full dense-phase reaction zone 17 is in the form of an inverted hollow truncated cone with a longitudinal section of an isosceles trapezoid. The transition section 18 is in the form of a hollow truncated cone with a longitudinal section of an isosceles trapezium with sides having an internal inclination angle α of about 25-85°, preferably about 30-75°

In some preferred embodiments, the present application provides the following technical solutions:

1. A process for catalytic cracking using a dilute-phase transport fluidized bed and a fast fluidized bed, comprising the steps of:
   i) introducing a preheated inferior heavy oil into a lower part of the dilute-phase transport fluidized bed to contact with a catalytic cracking catalyst and conduct a first catalytic cracking reaction while moving from bottom to top, to obtain a first reaction product and a semi-spent catalyst;
   ii) introducing the resulting first reaction product and the semi-spent catalyst into the bottom of the fast fluidized bed to conduct a second catalytic cracking reaction while moving from bottom to top, to obtain a second reaction product and a spent catalyst; wherein the catalyst in the fast fluidized bed is distributed in a full dense-phase pattern, and the distribution of the axial solid fraction ε in the fast fluidized bed satisfies: 0.1≤ε≤0.2;
   iii) sending the spent catalyst to a regenerator for regeneration by coke burning, and recycling at least a portion of the resulting regenerated catalyst to the bottom of the dilute-phase transport fluidized bed as the catalytic cracking catalyst; and
   iv) separating the second reaction product to obtain dry gas, liquefied petroleum gas, gasoline, diesel oil and slurry.

2. The process of Item 1, wherein the properties of the inferior heavy oil meet one, two, three, or four of the following criteria: a density at 20° C. of 900-1000 kg/m³, a carbon residue of 2-10 wt %, a total content of nickel and vanadium of 2-30 ppm, and a characterization factor K value of less than 12.1.

3. The process of Item 1, wherein the properties of the inferior heavy oil meet one, two, three, or four of the following criteria: a density at 20° C. of 910-940 kg/m³, a carbon residue of 3-8 wt %, a total content of nickel and vanadium of 5-20 ppm, and a characterization factor K value of less than 12.0.

4. The process of Item 1, wherein the inferior heavy oil is heavy petroleum hydrocarbons and/or other mineral oils;
   the heavy petroleum hydrocarbon is one or more selected from vacuum residuum, inferior atmospheric residuum, inferior hydrogenated residuum, coker gas oil, deasphalted oil, vacuum gas oil, high acid value crude oil and high metal crude oil, and said other mineral oil is one or more selected from coal liquefaction oil, oil sand bitumen and shale oil.

5. The process of Item 1, wherein the catalytic cracking catalyst comprises, based on the dry weight of the catalytic cracking catalyst, 1-50 wt % zeolite, 5-99 wt % inorganic oxide, and 0-70 wt % clay;
   the zeolite comprises a mesopore zeolite which is a ZSM zeolite and/or a ZRP zeolite and optionally a macropore zeolite which is one or more selected from rare earth exchanged Y, rare earth exchanged H-Y, ultrastable Y and high-silica Y.

6. The process of Item 5, wherein the mesopore zeolite accounts for 0-50 wt % of the total weight of zeolite on a dry weight basis.

7. The process of Item 5, wherein the mesopore zeolite accounts for 0-20 wt % of the total weight of zeolite on a dry weight basis.

8. The process of Item 1, wherein the conditions for the first catalytic cracking reaction include: a reaction temperature of 500-600° C., a reaction time of 0.05-5 seconds, a catalyst-to-oil weight ratio of (1-50): 1, a water-to-oil weight ratio of (0.03-0.5): 1, a catalyst density of 20-100 kg/m³, a vapor velocity of 4-18 m/s, a reaction pressure of 130-450 kPa, and a catalyst mass flow rate, $G_s$, of 180-500 kg/(m²·sec);
   the conditions for the second catalytic cracking reaction include: a reaction temperature of 510-650° C., a reaction time of 1-20 seconds, a catalyst-to-oil weight ratio of (3-50): 1, a water-to-oil weight ratio of (0.03-0.8): 1, a catalyst density of 120-290 kg/m³, a vapor velocity of 0.8-2.5 m/s, a reaction pressure of 130-450 kPa, and a catalyst mass flow rate, $G_s$, of 15-150 kg/(m²·s).

9. The process of Item 1, wherein the conditions for the first catalytic cracking reaction include: a reaction temperature of 520-580° C., a reaction time of 1-3 seconds, a catalyst-to-oil weight ratio of (5-25): 1, a water-to-oil weight ratio of (0.05-0.3): 1;
   the conditions for the second catalytic cracking reaction include: a reaction temperature of 550-620° C., a reaction time of 3-15 seconds, a catalyst-to-oil weight ratio of $(10^{-30})$: 1, a water-to-oil weight ratio of (0.05-0.5): 1, a catalyst density of 150-250 kg/m³, a vapor velocity of 1-1.8 m/s, and a catalyst mass flow rate, $G_s$, of 20-130 kg/(m²·sec.).

10. The process of Item 1, further comprising: introducing a C4 hydrocarbon fraction and/or a C5-C6 light gasoline fraction into the fast fluidized bed and/or dilute-phase transport fluidized bed for catalytic cracking reaction.

11. The process of Item 10, wherein the C4 hydrocarbon fraction and/or the C5-C6 light gasoline fraction are introduced before the position where the inferior heavy oil is introduced into the dilute-phase transport fluidized bed.

12. The process of Item 1, further comprising: introducing a supplementary catalyst into the fast fluidized bed to conduct the second catalytic cracking reaction together with the first reaction product and the semi-spent catalyst; wherein the carbon content of the supplementary catalyst is 0-1.0 wt. %.

13. The process of Item 12, wherein the supplementary catalyst accounts for 0-50 wt % of the total catalyst circulation rate of the dilute-phase transport fluidized bed and the fast fluidized bed.

14. The process of Item 12, wherein the supplementary catalyst accounts for 5-30 wt % of the total catalyst circulation rate of the dilute-phase transport fluidized bed and the fast fluidized bed.

15. The process of Item 12, wherein the supplementary catalyst is introduced into the bottom of the fast fluidized bed.

16. A catalytic cracking system, comprising a dilute-phase transport fluidized bed, a fast fluidized bed, an catalyst separation device, a reaction product separator and a regenerator;
   the dilute-phase transport fluidized bed is in fluid communication with the fast fluidized bed and is disposed at the upstream of the fast fluidized bed, along the flow direction of the reaction stream;
   the dilute-phase transport fluidized bed is provided with a catalyst inlet at the bottom and an inferior heavy oil inlet at the lower part, the fast fluidized bed is provided with an outlet at the top, the catalyst separation device is provided with an inlet, a catalyst outlet and a reaction product outlet, the reaction product separator is provided with a reaction product inlet, a dry gas outlet, a liquefied petroleum gas outlet, a gasoline outlet, a diesel oil outlet and a slurry outlet, and the regenerator is provided with a catalyst inlet and a catalyst outlet;

the catalyst inlet of the dilute-phase transport fluidized bed is in fluid communication with the catalyst outlet of the regenerator, the outlet of the fast fluidized bed is in fluid communication with the inlet of the catalyst separation device, the reaction product outlet of the catalyst separation device is in fluid communication with the reaction product inlet of the reaction product separator, and the catalyst outlet of the catalyst separation device is in fluid communication with the catalyst inlet of the regenerator.

17. The system of Item 16, wherein the fast fluidized bed is arranged coaxially with the dilute-phase transport fluidized bed and the fast fluidized bed is disposed above the dilute-phase transport fluidized bed.

The definition and calculation of each parameter in the present application are as follows:

(1) Axial solid fraction of catalyst, $\varepsilon$=pressure difference between two points in the reaction zone along the axial direction measured by a pressure difference meter÷distance between the two points along the axial direction÷catalyst particles density;

wherein the pressure difference is expressed in $kg/m^2$, the distance between the two points along the axial direction is expressed in meters (m), and the density of catalyst particles is expressed in $kg/m^3$.

Density of catalyst particles=framework density/
(pore volume of catalyst×framework density+1), wherein the framework density is expressed in $kg/m^3$ and the pore volume of catalyst is expressed in m 3, the framework density and the pore volume of catalyst are determined by pycnometer test method and aqueous titration method, respectively.

(2) Reaction time=volume of reaction zone/logarithmic mean volume flow rate of oil vapor;

wherein the volume of reaction zone is expressed in m 3, and the logarithmic mean volume flow rate of oil vapor is expressed in $m^3/s$;

Logarithmic mean volume flow rate of oil vapor=
$(V_{out}-V_{in})/\ln(V_{out}/V_{in})$, wherein $V_{out}$ and $V_{in}$ represent the volume flow rates of oil vapor at the outlet and the inlet of the reaction zone, respectively;

Volume flow rate of oil vapor at the outlet of the reaction zone $V_{out}=m/\rho_3$;

Volume flow rate of oil vapor at the inlet of the reaction zone $V_{in}=m/\rho_4$;

wherein m represents the feed rate of feedstock oil and atomizing steam per unit time, expressed in kg/s; $\rho_3$ represents the density of oil vapor at the outlet of the reaction zone, expressed in $kg/m^3$; $\rho_4$ represents the density of oil vapor at the inlet of the reaction zone, expressed in $kg/m^3$.

(3) Catalyst density in the reaction zone (or an upper, middle or lower part thereof)=pressure difference between two points in the reaction zone (or an upper, middle or lower part thereof) along the axial direction measured by a pressure difference meter÷distance between the two points along the axial direction;

wherein the pressure difference is expressed in $kg/m^2$, the reaction zone is divided equally into three parts, i.e. an upper part, a middle part and a lower part, along the axial direction, and the distance between the two points along the axial direction is expressed in meter (m).

(4) Vapor velocity=logarithmic mean volume flow rate of oil vapor÷cross-sectional area of reaction zone;

where the reaction zone is in a non-cylindrical form, the vapor velocity refers to the logarithmic mean value of the vapor velocity at the bottom of the reaction zone and the vapor velocity at the top of the reaction zone.

(5) Catalyst mass flow rate $G_s$=catalyst circulation rate of reactor÷cross-sectional area of reaction zone;

where the reaction zone is in a non-cylindrical form, the catalyst mass flow rate, $G_s$, refers to the logarithmic mean value of G s at the bottom of the reaction zone and G s at the top of the reaction zone;

wherein the catalyst circulation rate is expressed in kg/s;

Catalyst circulation rate of reactor=coke generation rate÷(carbon content of spent catalyst−carbon content of regenerated catalyst);

wherein, the coke generation rate is expressed in kg/s, and the carbon content of spent catalyst and the carbon content of regenerated catalyst are both expressed in content by weight;

Coke generation rate=flue gas amount×($CO_2$%+CO %)÷Vm×M;

wherein Vm represents molar volume of gas, which takes the value of $22.4\times10^{-3}$ $m^3$/mol, and M represents the molar mass of carbon element, which takes the value of $12\times10^{-3}$ kg/mol;

Flue gas amount=(air rate×79 vol %)/(1−$CO_2$%−CO %−$O_2$%);

wherein the air rate is expressed in $m^3/s$, the flue gas amount is expressed in $m^3/s$, and the $CO_2$%, CO % and $O_2$% represent the volume percentages of the $CO_2$, CO and $O_2$ in the flue gas, respectively.

EXAMPLES

The present application will be further illustrated with reference to the following examples, but the present application is not limited thereto.

The feedstock oils used in the following examples and comparative examples are all hydrogenated residuum, of which the properties are shown in Table 1. The catalyst used is a commercial catalytic cracking catalyst purchased from the Catalyst Branch of Sinopec Co., Ltd., under the trade name of DMMC-2.

TABLE 1

| Properties of the feedstock oil | |
|---|---|
| Density (20° C.)/g · $cm^{-3}$ | 0.9237 |
| Refractive index/70° C. | 1.4914 |
| Basic nitrogen/µg · $g^{-1}$ | 506 |
| Conradson Carbon residue/wt % | 3.11 |
| Characteristic factor K | 11.8 |
| Distillation range/° C. | |
| 5 vol % | 357 |
| 10 vol % | 387 |
| 30 vol % | 443 |
| 50 vol % | 490 |
| 70 vol % | 550 |
| Metal content/µg · $g^{-1}$ | |
| Fe | 34.4 |
| Ni | 4.4 |
| Ca | 7.8 |

TABLE 1-continued

Properties of the feedstock oil

| | |
|---|---|
| V | 4.3 |
| Na | 2.0 |

Example 1

This example was carried out in accordance with the process flow shown in FIG. 1 on a medium-sized apparatus, using the hydrogenated residuum as feedstock oil, the DMMC-2 catalyst as catalyst, a combined reactor comprising a dilute-phase transport fluidized bed and a fast fluidized bed connected in series as the reactor. A preheated feedstock oil was introduced into the dilute-phase transport fluidized bed to contact with the catalyst for a first cracking reaction. The reaction effluent moved upwards into the fast fluidized bed to mix with a supplemented regenerated catalyst for a second catalytic cracking reaction. The carbon content of the supplemented regenerated catalyst was 0.05 wt %, the supplemented catalyst was introduced at ⅓ of the total height of the fast fluidized bed, and the supplemented catalyst accounted for 5 wt % of the catalyst circulation rate of the reactor. The catalyst in the fast fluidized bed was controlled to be distributed in a full dense-phase pattern by adjusting the vapor velocity and providing an umbrella-shaped catalyst distribution plate at the bottom of the fast fluidized bed, so that the axial solid fraction ε of the catalyst in the fast fluidized bed was within the range of 0.1-0.2 from bottom to top. The reaction product and the spent catalyst were quickly separated, and the reaction product was further separated in a product separation system according to the distillation range. The spent catalyst was passed into a stripper under gravity, the hydrocarbon vapors adsorbed on the spent catalyst were stripped by steam, the stripped catalyst was directly passed into a regenerator without heat exchange and contacted with air for regeneration by coke burning, and the regenerated catalyst was recycled to the reactor for reuse. The operating conditions used and the product distribution are listed in Table 2.

As can be seen from Table 2, in this example, the ethylene yield is 5.2 wt %, the propylene yield is 18.2 wt %, the light aromatics yield is 11.5 wt %, and the dry gas and coke yields are 10.8 wt % and 8.5 wt %, respectively.

Example 2

This example was carried out in accordance with the process flow shown in FIG. 2 on a medium-sized apparatus, using the hydrogenated residuum as feedstock oil, the DMMC-2 catalyst as catalyst, and a combined reactor comprising a dilute-phase transport fluidized bed and a fast fluidized bed connected in series as the reactor. A preheated feedstock oil was introduced into the bottom of the dilute-phase transport fluidized bed to contact with the catalytic cracking catalyst for a first cracking reaction. The reaction effluent moved upwards into the full dense-phase reaction zone of the fast fluidized bed to mix with a supplemented regenerated catalyst for a second catalytic cracking reaction. The carbon content of the supplemented regenerated catalyst was 0.05 wt %, the supplemented catalyst was introduced at ⅓ of the total height of the fast fluidized bed, and the supplemented catalyst accounted for 5 wt % of the catalyst circulation rate of the reactor. The catalyst in the full dense-phase reaction zone was controlled to be distributed in a full dense-phase pattern by adjusting the vapor velocity and providing an umbrella-shaped catalyst distribution plate at the bottom of the full dense-phase reaction zone, so that the axial solid fraction ε of the catalyst in the full dense-phase reaction zone was within the range of 0.1-0.2 from bottom to top. The reaction product and the spent catalyst were quickly separated, and the reaction product was further separated in a product separation system according to the distillation range. The spent catalyst was passed into a stripper under the action of gravity, the hydrocarbon vapors adsorbed on the spent catalyst were stripped by steam, the stripped catalyst was directly passed into a regenerator without heat exchange and contacted with air for regeneration by coke burning, and the regenerated catalyst was recycled to the reactor for reuse. The mixed C4 fraction obtained after the separation of the reaction product was recycled to the bottom of the dilute-phase transport fluidized bed for further reaction. The operating conditions used and the product distribution are listed in Table 2.

As can be seen from Table 2, in this example, the ethylene yield is 5.9 wt %, the propylene yield is 21.1 wt %, the light aromatics yield is 11.8 wt %, and the dry gas and coke yields are 10.7 wt % and 8.4 wt %, respectively.

Comparative Example 1

This comparative example was carried out on a medium-sized apparatus, using the hydrogenated residuum as feedstock oil, the DMMC-2 catalyst as catalyst, and a combined reactor comprising a riser and a fluidized bed connected in series as the reactor. A preheated feedstock oil was introduced into a lower part of the riser to contact with a catalyst for catalytic cracking reaction. The resulting reaction oil vapor, steam and spent catalyst were passed into the dense-phase fluidized bed through the outlet of the riser for further reaction. The reaction effluent was passed into a closed cyclone where the reaction product and the spent catalyst were quickly separated, and the reaction product was further separated in a product separation system according to the distillation range. The spent catalyst was passed into a stripper under the action of gravity, the hydrocarbon vapors adsorbed on the spent catalyst were stripped by steam, the stripped catalyst was directly passed into a regenerator without heat exchange and contacted with air for regeneration by coke burning, and the regenerated catalyst was recycled to the riser for reuse. The operating conditions used and the product distribution are listed in Table 2.

As can be seen from the results of Table 2, in this comparative example, the ethylene yield is 3.7 wt %, the propylene yield is 12.8 wt %, the light aromatics yield is 5.5 wt %, and the dry gas and coke yields are 12.9 wt % and 13.3 wt %, respectively.

Comparative Example 2

This comparative example was substantially the same as Example 1, except that no catalyst distribution plate was provided at the bottom of the fast fluidized bed, and the axial solid fraction ε of the catalyst in the fast fluidized bed showed a gradient of 0.1←0.2←0.3 from top to bottom. The operating conditions used are the same as in Example 1, and the product distribution is given in Table 2.

TABLE 2

Comparison of results of Examples 1-2 and Comparative Examples 1-2

|  | Ex. 1 | Ex. 2 | Comp. Ex. 1 | Comp. Ex. 2 |
|---|---|---|---|---|
| Conditions in the riser/dilute-phase transport fluidized bed | | | | |
| Temperature at the reactor outlet, °C. | 565 | 565 | 585 | 565 |
| Reaction time, s | 2 | 2 | 2 | 2 |
| Water-to-oil weight ratio | 0.25 | 0.25 | 0.25 | 0.25 |
| Catalyst-to-oil weight ratio | 15 | 15 | 10 | 15 |
| Catalyst density, kg/m$^3$ | 60 | 60 | 60 | 60 |
| Vapor velocity, m/s | 8 | 8 | 12 | 8 |
| Reaction pressure, kPa | 210 | 210 | 210 | 210 |
| Gs, kg/(m$^2$ · s) | 300 | 300 | 300 | 300 |
| Conditions in the dense-phase/fast fluidized bed | | | | |
| Bed/outlet temperature, °C. | 585 | 585 | 565 | 585 |
| Weight hourly space velocity, hr$^{-1}$ | / | / | 4 | / |
| Reaction time, s | 3 | 3 | / | 3 |
| Catalyst density in the upper part of the reaction zone, kg/m$^3$ | 195 | 190 | 480 | 120 |
| Catalyst density in the lower part of the reaction zone, kg/m$^3$ | 200 | 195 | 480 | 200 |
| Vapor velocity, m/s | 2 | 2.2 | 0.6 | 2 |
| Gs, kg/(m$^2$ · s) | 75 | 80 | / | 75 |
| Product distribution, wt % | | | | |
| Dry gas | 10.8 | 10.7 | 12.9 | 11.9 |
| ethylene | 5.2 | 5.9 | 3.7 | 4.2 |
| Liquefied petroleum gas | 38 | 39.3 | 26.1 | 32.7 |
| propylene | 18.2 | 21.1 | 12.8 | 15.5 |
| C4 fraction | 12.5 | 8.1 | 10.5 | 11.1 |
| Gasoline | 25.9 | 25.0 | 22.9 | 24.9 |
| BTX | 11.5 | 11.8 | 5.5 | 8.8 |
| Diesel oil | 11.8 | 11.6 | 16.4 | 13.6 |
| Slurry | 5 | 5.0 | 8.4 | 5.8 |
| Coke | 8.5 | 8.4 | 13.3 | 11.1 |
| Total | 100.0 | 100.0 | 100.0 | 100.0 |

From the results of the above examples and comparative examples, it can be seen that the process according to the present application shows higher yields of ethylene, propylene and light aromatics, while providing lower yields of dry gas and coke.

Preferred embodiments of the present application have been described in detail above, but the present application is not limited to the details of the above embodiments. Various modifications can be made to the technical solution of the present application within the inventive concept thereof, and those modifications should fall within the scope of the present application.

It should be noted that, various features described in the above-described embodiments may be combined in any suitable manner, where there is no confliction. To avoid unnecessary repetition, those possible combinations are not described in the present application.

In addition, various embodiments of the present application may also be combined arbitrarily, and those combinations should also be considered as a part of the present application, as long as they do not depart from the spirit of the present application.

The invention claimed is:

1. A system catalytic cracking of hydrocarbon oils, comprising a catalytic cracking reactor, a catalyst separation device, an optional reaction product separator, and a regenerator,
   wherein the catalytic cracking reactor comprises a dilute-phase transport fluidized bed and a fast fluidized bed connected in series, with the dilute-phase transport fluidized bed being in fluid communication with the fast fluidized bed and disposed at an upstream of the fast fluidized bed, along the flow direction of a reaction stream,
   the dilute-phase transport fluidized bed is provided with a catalyst inlet at a bottom and a first feedstock inlet at a lower part, the fast fluidized bed is provided with an outlet at a top and an optional second feedstock inlet at the bottom, the catalyst separation device is provided with an inlet, a catalyst outlet and a reaction product outlet, the optional reaction product separator is provided with a reaction product inlet, a dry gas outlet, a liquefied petroleum gas outlet, a gasoline outlet, a diesel oil outlet and a slurry outlet, and the regenerator is provided with a catalyst inlet and a catalyst outlet,
   the catalyst inlet of the dilute-phase transport fluidized bed is in fluid communication with the catalyst outlet of the regenerator, the outlet of the fast fluidized bed is in fluid communication with the inlet of the catalyst separation device, the reaction product outlet of the catalyst separation device is in fluid communication with the reaction product inlet of the optional reaction product separator, and the catalyst outlet of the catalyst separation device is in fluid communication with the catalyst inlet of the regenerator,
   wherein the fast fluidized bed comprises a full dense-phase reaction zone, a cross-sectional diameter of the bottom end of the full dense-phase reaction zone is greater than or equal to the diameter of the dilute-phase transport fluidized bed, the bottom or a side wall of the full dense-phase reaction zone is provided with one or more inlets for supplementary catalyst, each independently disposed at about 0-90% of the total height of the fast fluidized bed,
   wherein the full dense-phase reaction zone is in the form of an inverted truncated cone with a longitudinal section of an isosceles trapezoid, and the transition section of the full dense-phase reaction zone is in the form of a hollow truncated cone with a longitudinal section of an isosceles trapezium with sides having an internal inclination angle α of about 25-85°, and the axial solid fraction & of the catalyst in the fast fluidized bed is within the range of 0.1-0.2 from bottom to top, and
   the fast fluidized bed is further provided with an umbrella-shaped catalyst distribution plate at the bottom.

2. The system according to claim 1, wherein the fast fluidized bed is coaxially arranged with the dilute-phase transport fluidized bed, and the fast fluidized bed is disposed above the dilute-phase transport fluidized bed.

3. The system according to claim 2, wherein the fast fluidized bed is provided with the second feedstock inlet at the bottom and a gas distributor is provided at the second feedstock inlet.

4. The system according to claim 1, wherein the fast fluidized bed further comprises a transition section connected to the full dense phase reaction zone, the dilute-phase transport fluidized bed is in communication with the bottom end of the full dense-phase reaction zone, the top end of the full dense-phase reaction zone is in communication with the outlet section of the reactor through the transition section, the bottom of the full dense-phase reaction zone is optionally provided with one or more second feedstock inlets.

5. The system according to claim 4, wherein the cross-sectional diameter of the top end of the full dense-phase reaction zone is greater than the diameter of the outlet section.

6. The system according to claim 5, wherein the second or more inlets for supplementary catalyst, each independently disposed at about 30-75% of the total height of the fast fluidized bed.

7. The system according to claim 5, wherein the full dense-phase reaction zone has a bottom cross-sectional diameter of about 0.2-10 meters; and a ratio of a top cross-sectional diameter to the bottom cross-sectional diameter of the full dense-phase reaction zone ranges from 1 to about 50; a ratio of the maximum cross-sectional diameter of the full dense-phase reaction zone to the total height of the fast fluidized bed is about 0.005:1 to about 1:1; and a ratio of the height of the full dense-phase reaction zone to the total height of the fast fluidized bed is about 0.1:1 to about 0.9:1.

8. The system according to claim 5, wherein the full dense-phase reaction zone has a bottom cross-sectional diameter of about 1-5 meters; and a ratio of a top cross-sectional diameter to the bottom cross-sectional diameter of the full dense-phase reaction zone ranges from about 1.5 to about 5; a ratio of the diameter of the maximum cross-section of the full dense-phase reaction zone to the total height of the fast fluidized bed is about 0.05:1 to about 0.5:1; and a ratio of the height of the full dense-phase reaction zone to the total height of the fast fluidized bed is about 0.5:1 to about 0.8:1.

9. The system according to claim 4, wherein a ratio of the height of the transition section to the total height of the fast fluidized bed is about 0.1:1 to about 0.9:1.

10. The system according to claim 4, wherein the transition section of the full dense-phase reaction zone is in the form of a hollow truncated cone with a longitudinal section of an isosceles trapezium with sides having an internal inclination angle $\alpha$ of about 30-75°, and a ratio of a height of the transition section to a total height of the fast fluidized bed is about 0.2:1 to about 0.5:1.

11. The system according to claim 1, wherein the bottom of the fast fluidized bed is provided with the first inlet for supplementary catalyst, and a second or more inlets for supplementary catalyst is disposed at about 20-80% of the total height of the fast fluidized bed.

* * * * *